United States Patent
Tsai et al.

(10) Patent No.: US 10,567,806 B2
(45) Date of Patent: Feb. 18, 2020

(54) METHOD OF BLOCK-BASED ADAPTIVE LOOP FILTERING

(71) Applicant: MediaTek Inc., Hsin-Chu (TW)

(72) Inventors: Chia-Yang Tsai, Zhubei (TW); Ching-Yeh Chen, Taipei (TW); Yu-Wen Huang, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 657 days.

(21) Appl. No.: 15/034,115

(22) PCT Filed: Nov. 10, 2014

(86) PCT No.: PCT/CN2014/090683
§ 371 (c)(1),
(2) Date: May 3, 2016

(87) PCT Pub. No.: WO2015/070739
PCT Pub. Date: May 21, 2015

(65) Prior Publication Data
US 2016/0269753 A1 Sep. 15, 2016

Related U.S. Application Data

(60) Provisional application No. 61/948,183, filed on Mar. 5, 2014, provisional application No. 61/904,511, filed on Nov. 15, 2013.

(51) Int. Cl.
*H04N 19/82* (2014.01)
*H04N 19/176* (2014.01)
(Continued)

(52) U.S. Cl.
CPC .......... *H04N 19/82* (2014.11); *H04N 19/117* (2014.11); *H04N 19/119* (2014.11); *H04N 19/14* (2014.11);
(Continued)

(58) Field of Classification Search
CPC ........ H04N 19/82; H04N 19/68; H04N 19/18; H04N 19/172; H04N 19/14; H04N 19/117;
(Continued)

(56) References Cited

U.S. PATENT DOCUMENTS 8,606,028 B2  12/2013  Noda et al.
9,485,521 B2 * 11/2016  Lim ........................ H04N 19/82
(Continued)

FOREIGN PATENT DOCUMENTS

| CN | 1571515 | 1/2005 |
| CN | 1669326 | 9/2005 |

(Continued)

OTHER PUBLICATIONS

Panis et al.; Bitstream syntax description: a tool for multimedia resource adaptation within MPEG-21; 2003.*
(Continued)

*Primary Examiner* — Joseph W Becker
(74) *Attorney, Agent, or Firm* — McClure, Qualey & Rodack, LLP (57) ABSTRACT

A method of adaptive loop filtering for reconstructed video to improve the performance is disclosed. In one embodiment, a loop filter is selected from one or more candidate filters including a circular symmetrical filter candidate. The candidate filters also may include a ½-symmetry filter candidate and a flag is used to select between different symmetries. In another embodiment, a priority-based block filter merge is disclosed. A filter merge list consisting of no more than a first number of filter candidates selected from corresponding filters used by corresponding set members in the neighboring block set is generated according to a priority order of the set members in the neighboring block set. In yet another embodiment, the loop filter is shared by recon- (Continued)

structed video in multiple image units of a same group. The filter merge groups are identified by differences of consecutive group indices.

4 Claims, 5 Drawing Sheets

(51) Int. Cl.
*H04N 19/70* (2014.01)
*H04N 19/119* (2014.01)
*H04N 19/196* (2014.01)
*H04N 19/117* (2014.01)
*H04N 19/14* (2014.01)
*H04N 19/172* (2014.01)
*H04N 19/182* (2014.01)
*H04N 19/18* (2014.01)
*H04N 19/68* (2014.01)

(52) U.S. Cl.
CPC ......... *H04N 19/172* (2014.11); *H04N 19/176* (2014.11); *H04N 19/18* (2014.11); *H04N 19/182* (2014.11); *H04N 19/196* (2014.11); *H04N 19/68* (2014.11); *H04N 19/70* (2014.11)

(58) Field of Classification Search
CPC .. H04N 19/182; H04N 19/196; H04N 19/119; H04N 19/70; H04N 19/176
See application file for complete search history.

(56) References Cited

U.S. PATENT DOCUMENTS

| | | |
|---|---|---|
| 2003/0202597 A1 | 10/2003 | Turaga et al. |
| 2004/0076333 A1 | 4/2004 | Zhang et al. |
| 2011/0274158 A1* | 11/2011 | Fu .................. H04N 19/115 375/240.02 |
| 2012/0189064 A1 | 7/2012 | Kossentini et al. |
| 2012/0321205 A1 | 12/2012 | Lai et al. |
| 2015/0350648 A1 | 12/2015 | Fu et al. |

FOREIGN PATENT DOCUMENTS

| | | |
|---|---|---|
| CN | 101411202 A | 4/2009 |
| CN | 102804776 | 11/2012 |

OTHER PUBLICATIONS

International Search Report dated Feb. 17, 2015, issued in application No. PCT/CN2014/090683.

Lai, P.L., et al.; "Loop filter with directional similarity mapping (DSM);" Joint Collaborative Team on Video Coding (JCT-VC) of ITU-T SG16 WP3 and ISO/IEC JTC1/SC29/WG11; Jan. 2011; pp. 1-8.

"H.265 Recommendation—High efficiency video coding;" ITU-T Telecommunication Standardization Sector of ITU; Apr. 2013; pp. 1-318.

* cited by examiner

METHOD OF BLOCK-BASED ADAPTIVE LOOP FILTERING

CROSS REFERENCE TO RELATED APPLICATIONS

The present invention claims priority to U.S. Provisional Patent Application Ser. No. 61/904,511, filed on Nov. 15, 2013, entitled "Block-based Adaptive Loop Filtering," and U.S. Provisional Patent Application Ser. No. 61/948,183, filed on Mar. 4, 2014, entitled "Block-based Adaptive Loop Filtering," The U.S. Provisional patent applications are hereby incorporated by reference in their entireties.

FIELD OF THE INVENTION

The present invention relates to video coding. In particular, the present invention relates to Block-Based Adaptive Loop Filtering (ALF) for video coding.

BACKGROUND AND RELATED ART

High efficiency video coding (HEVC) is a new-generation international video coding standard developed by the Joint Collaborative Team on Video Coding (JCT-VC). The standard is based on the conventional hybrid coding approach. According to HEVC, a picture is divided into multiple non-overlapped Largest Coding Units (LCUs), also called Coding Tree Blocks (CTBs). The pixel values of a Coding Unit (CU) are predicted spatially or temporally. The resulting residual signal is transformed for further redundancy removal. The transform coefficients are then quantized and entropy coded. The reconstructed picture is recovered from the decoded residual signal and the prediction signal. After reconstruction, the reconstructed picture is further processed by in-loop filtering to reduce coding artifacts.

Figure 1:
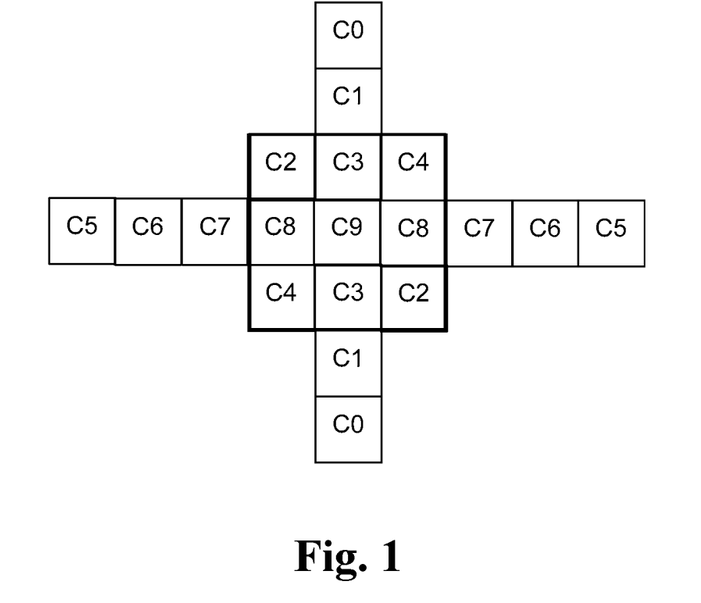
FIG. 1 illustrates the filter shape corresponding to a 9×7 cross with a 3×3 square in the center.

Prior to the adoption of HEVC Test Model 7 (HM-7), an in-loop filtering technique, named Adaptive Loop Filter (ALF), was included in the test model. To optimize the performance, ALF uses Wiener filtering techniques to derive filter coefficients. Furthermore, multiple filters may be used for different picture regions. The coefficients are coded in Adaptation Parameter Set (APS), and On/Off control flags are coded in CTU level syntax elements. The filter shape is 9×7 cross with a 3×3 square in the center as shown in FIG. 1. Due to the symmetry property of this 9×7 filter, only half of the coefficients need to be coded.

Figure 2:
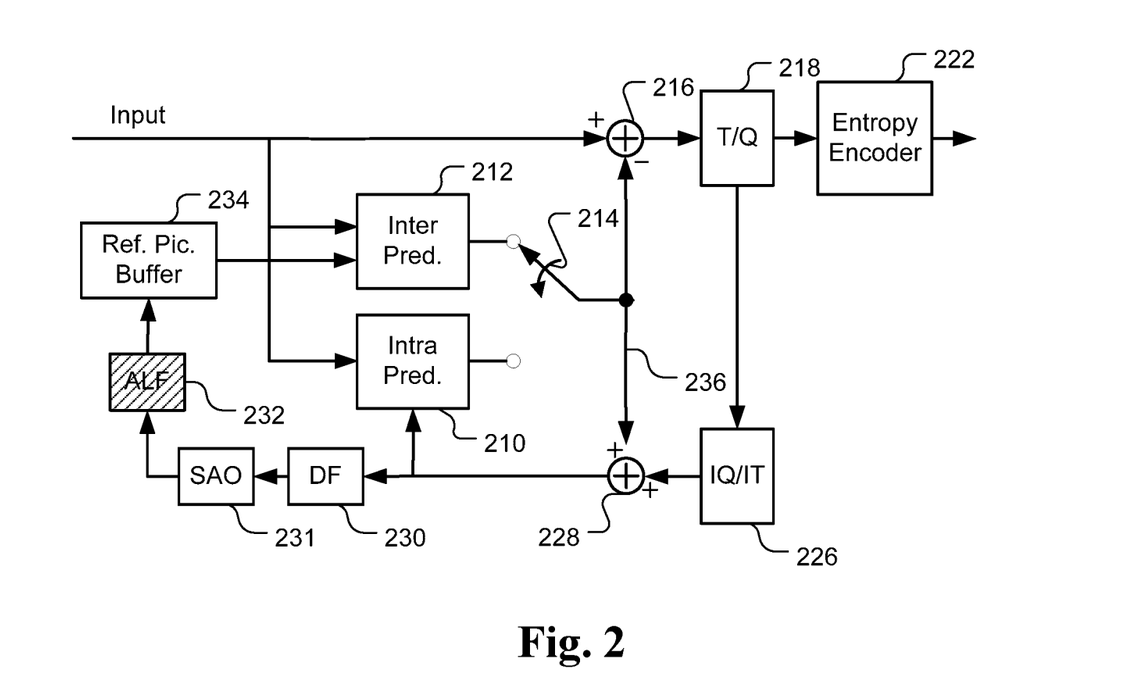
FIG. 2 illustrates an example of an Inter/Intra video coding system incorporating in-loop processing.

FIG. 2 illustrates an exemplary adaptive Inter/Intra video coding system incorporating in-loop processing. The input picture is coded by either Intra Prediction (210) or Inter Prediction (i.e., Motion Estimation/Motion Compensation 212). For inter-prediction, Motion Estimation (ME)/Motion Compensation (MC) 212 is used to provide prediction data based on video data from other picture or pictures. Switch 214 selects Intra Prediction 210 or inter-prediction data and the selected prediction data is supplied to Adder 216 to form prediction errors, also called residues. The prediction error is then processed by Transform/Quantization (T/Q) 218. The transformed and quantized residues are then coded by Entropy Encoder 222 to form a video bitstream corresponding to the compressed video data. The bitstream associated with the residues is then packed with side information such as motion, mode, and other information associated with the image area. The side information may also be subject to entropy coding to reduce required bandwidth. In the Intra mode, a reconstructed block may be used to form Intra prediction of spatial neighboring block. Therefore, a reconstructed block from REC 228 may be provided to Intra Prediction 210. When an inter-prediction mode is used, a reference picture or pictures have to be reconstructed at the encoder end as well. Consequently, the transformed and quantized residues are processed by Inverse Quantization/Inverse Transform (IQ/IT) 226 to recover the residues. The residues are then added back to prediction data 236 at Reconstruction (REC) 228 to reconstruct video data. The reconstructed video data can be stored in Reference Picture Buffer 234 and used for prediction of other frames.

As shown in FIG. 2, incoming video data undergoes a series of processing in the encoding system. The reconstructed video data from REC 228 may be subject to various impairments due to a series of processing. Accordingly, various in-loop processing is applied to the reconstructed video data before the reconstructed video data are stored in the Reference Picture Buffer 234 in order to improve video quality. In-loop filtering including deblocking (DF) processing module 230, Sample Adaptive Offset (SAO) processing module 231, and Adaptive Loop Filter (ALF) 232 have been developed to enhance picture quality. The in-loop filter information may have to be incorporated in the bitstream so that a decoder can properly recover the required information. In FIG. 2, ALF 232 is applied after the reconstructed video from REC 228 is processed by DF 230 and SAO 231. Nevertheless, ALF 232 may also be applied to the reconstructed video from REC 228 or ALF 232 is applied after the reconstructed video from REC 228 is processed by DF 230.

BRIEF SUMMARY OF THE INVENTION

A method of adaptive loop filtering for reconstructed video to improve the performance is disclosed. In one embodiment, a loop filter is selected from one or more candidate filters including a circular symmetrical filter candidate and the loop filter selected is then applied to first video data associated with a reconstructed block. The candidate filters also may include a ½-symmetrical filter candidate. A flag can be incorporated in the bitstream to select between the circular symmetrical filter candidate and the ½-symmetrical filter candidate. The first video data corresponds to the reconstructed video data, the output data resulted from applying deblocking process to the reconstructed video data, or the output data resulted from applying the deblocking process and sample adaptive offset (SAO) process to the reconstructed video data.

In another embodiment, a loop filter is selected from two or more candidate filters having different kinds of adaptive filter symmetry, and the loop filter selected is then applied to first video data associated with a reconstructed block. The loop filter selection may be implicit or explicit. An explicit selection is to incorporate a flag in the bitstream.

In another embodiment, a priority-based block filter merge is disclosed. A neighboring block set consisting of set members corresponding to neighboring blocks of the current reconstructed block is selected. A filter merge list consisting of no more than a first number of filter candidates selected from corresponding filters used by corresponding set members in the neighboring block set is generated according to a priority order of the set members in the neighboring block set. A loop filter is then selected from the filter merge list and applied to the video data associated with the current reconstructed block. The corresponding filter of each corresponding set member is added to the filter merge list from the set member with a highest priority to the set member with a lowest priority until a maximum number of filter candidates is reached or the set member with the lowest priority is reached. One corresponding filter added to the filter merge list before the other corresponding filter is assigned a smaller filter index than the other corresponding filter. The loop filter selected from the filter merge list can be coded by a filter index to identify the loop filter selected.

In yet another embodiment, the loop filter can be shared by reconstructed video in multiple image units of a same group. In other words, the multiple image units are merged to use the same loop filter. Accordingly, the reconstructed video in all image units of the same group can use the same filter parameters for the group. Each picture of the reconstructed video is partitioned into a first number of image units and each of the first number of image units is assigned an image unit index. According to this embodiment, the first number of image units is divided into a second number of filter groups and a corresponding loop filter is selected for each filter group. The corresponding loop filter is applied to video data associated with all image units in each filter group. Information for loop filter sharing associated with the second number of filter groups is signaled using a group index for each filter group represented by the number of image units in each group. The filter information associated with the loop filters for the filter groups is also signaled in the bitstream. In one example, the group index and the filter information associated with the corresponding loop filter of each filter group are incorporated in consecutive locations of a coded bitstream for all filter groups.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "one embodiment," "an embodiment," or similar language means that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

In various embodiments of the present invention, block-based adaptive loop filtering techniques are disclosed to improve the coding efficiency.

First Embodiment—Adaptive Filter Symmetry

Figure 3A:
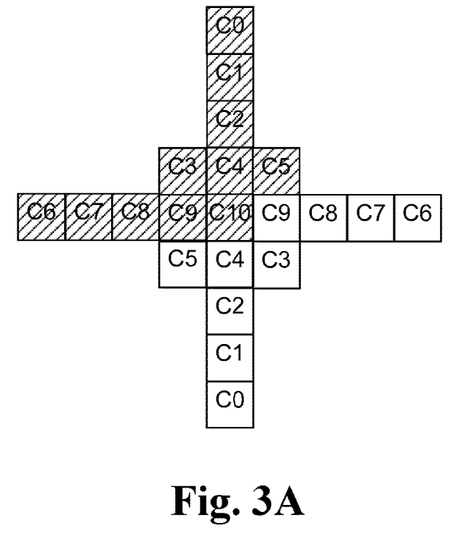
FIG. 3A illustrates an example of a ½-symmetry filter having a 9×9 cross and a 3×3 square filter footprint.

The bitrate overhead associated with coding filter coefficients depends on the number of filter taps to be coded. When a symmetric filter is used, only partial filter coefficients need to be coded. In the related arts, there is a so-called ½-symmetry filter design to let only half the filter coefficients be coded except for the center coefficient. As shown in FIG. 3A, the distribution of filter coefficients is ½-symmetry along the diagonal direction, and only half of the filter taps need to be coded.

Figure 3B:
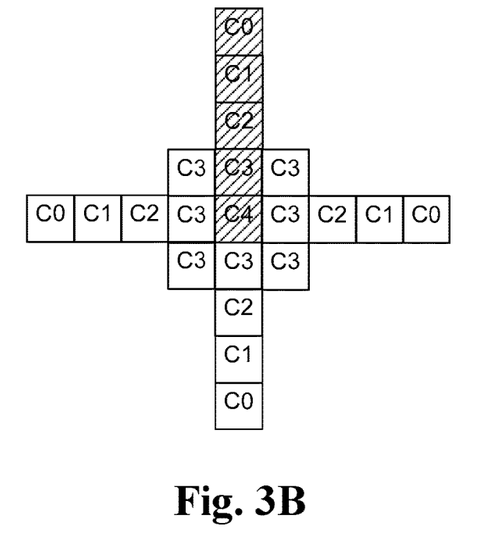
FIG. 3B illustrates an example of a full-symmetry filter having a 9×9 cross and a 3×3 square filter footprint according to an embodiment of the present invention.

In the first embodiment of the present invention, full-symmetry filter is disclosed. As shown in FIG. 3B, the distribution of filter coefficients is like a concentric circle. For the exemplary full-symmetry filter with a 9×9 cross and a 3×3 square filter footprint, only 5 filter coefficients need to be coded. Therefore, the number of coefficients is reduced from 10 to 5 compared to the filter in FIG. 3A. Furthermore, a flag can be coded to indicate which filter symmetry is selected. For example, a flag can be used to select between the ½-symmetry filter and the full-symmetry filter as shown in FIG. 3A and FIG. 3B respectively. The switchable filter symmetry design in the first embodiment allows adaptively switching between two or more kinds of adaptive filter symmetry, for example switching between the non-symmetrical filter in FIG. 1 and the ½-symmetry filter in FIG. 3A, or switching between the non-symmetrical filter in FIG. 1, the ½-symmetry filter in FIG. 3A, and full-symmetry filter in FIG. 3B. While a filter footprint with a 9×9 cross and a 3×3 square is used as an example of selectable filter symmetry according to the first embodiment of the present invention, other filter footprints may also be used to provide selectable filter symmetry. For example, a filter footprint with a 7×7 cross and a 3×3 square can also be used.

Second Embodiment—Priority-Based Block Filter Merge

While the full-symmetry filter can further reduce the overhead bitrate associated with the filter coefficients compared to the ½-symmetry filter, filter merge technique can even totally spare the need for transmitting the coefficients for a block. Usually, the texture characteristics of neighboring coding block are very similar to the current coding block. Therefore, a loop filter for the neighboring coding block may be directly used by the current coding block to save bitrate overhead. The case that two neighboring blocks share the same filter coefficients is referred as filter merge. The filter merge can use any loop filter type, such as the ½-symmetry filter, the full-symmetry filter, or a non-symmetrical filter.

In the second embodiment of the present invention, a priority-based block filter merge scheme is disclosed. The encoding process is described as follows:

Step 1: Choose up to N candidates from M possible neighboring blocks. There is a pre-defined priority order of the M possible neighboring blocks. If the possible neighboring block is outside the picture, slice, or tile boundary, it will be regarded as unavailable.

Step 2: From the up to N candidates, choose one filter and code its filter index in the bitstream.

Figure 4:
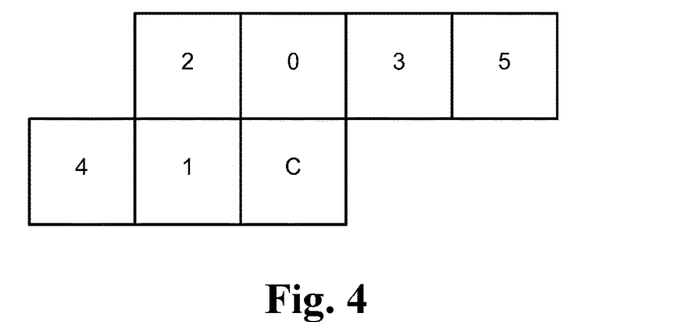
FIG. 4 illustrates an example of neighboring block set for a current block C used for priority-based filter merge according to an embodiment of the present invention.

Therefore, following Step 1, decoder can reconstructed N candidates and then choose the filter according to the decoded filter index. For example, as shown in FIG. 4, C is the current coding block and there are 6 possible neighboring blocks. In FIG. 4, the numbers associated with the neighboring blocks indicate the priority order used to form a merge list. For example, the block above block C has priority "0", i.e., the highest priority in this example. The block on the left has priority "1", i.e., the second highest priority. The merge list is generated based on the loop filters used by the neighboring blocks. The merge list generating process starts with the neighboring block with the highest priority. The loop filter used by the neighboring block is added to the merge list and a filter index is assigned to the filter added. If the filter is already in the merge list, the generating process moves on to the next neighboring block. The merge list generating process continues until a maximum number of candidates is reached or the last neighboring block (i. e, the lowest-priority neighboring block) has been checked. In one example, up to 4 filter candidates from the neighboring blocks can be chosen as the merge list. Therefore, a 2-bit filter index will be sufficient to indicate which of the filter candidates of neighboring blocks is selected for the current coding block. In other words, the current block is merged with a neighboring block and uses the same filter parameters of the corresponding neighboring block.

Third Embodiment—Syntax Structure

An embodiment of the present invention uses hierarchical syntax structure to signal ALF filter selected for each coding block. For example, different types of syntax elements can be included in sequence level, picture level, slice level and coding tree block (CTB) level as shown below:

a. Sequence level
A 1-bit flag is coded to indicate whether ALF is enabled or not for the current coding sequence.

b. Picture level
The shared filter parameters are coded in picture level. The shared filter in the picture level can be regarded as a global sharing filter among different slices.

c. Slice level
Individual flags (e.g., 3) are coded to indicate whether ALF is enabled or not for each color component of the coding block in the coding slice.

d. Coding tree block (CTB) level
Three filter modes in the CTB level are used including a new filter (NEW) mode, a block merge (MERGE) mode, and a shared filter (SHARE) mode. The filter mode index is coded to indicate which filter mode is selected. For NEW mode, new filter coefficients are coded for the current CTB. For MERGE mode, neighboring filter is used and only the merge index is coded. For SHARE mode, the shared filter coded in the picture level is used and no syntax element is coded after the filter mode index.

Fourth Embodiment—Syntax Structure for Filter Merge

Figure 5:
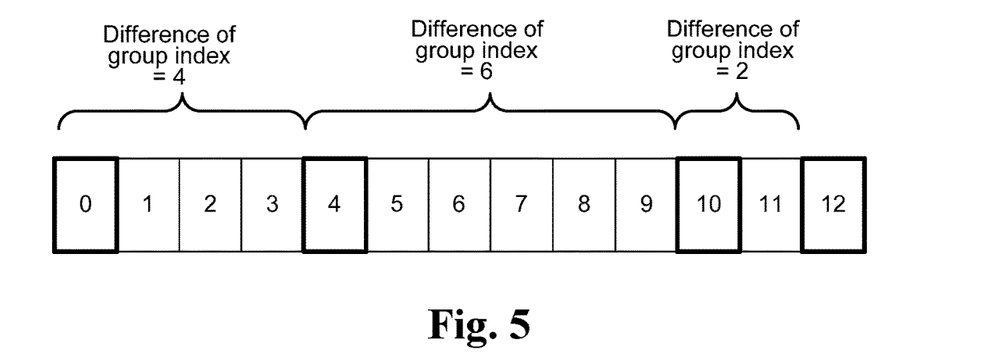
FIG. 5 illustrates an example of signaling of filter merge using differences of consecutive group indices according to an embodiment of the present invention.

In HM7.0, the ALF parameters are coded in the picture level, and multiple filters are supported for the luma component. The pixels in a picture are classified into several groups, and each group has one corresponding filter. Successive groups can be merged and share the same filter to reduce the required side information. However, the original merge syntax is not efficient when the number of filters is small. Therefore, improved syntax design is disclosed, where the merge information is represented by using the differences between successive group indices. For example, each frame is partitioned into multiple image partitions or image units, such as coding tree blocks (CTBs) or coding units. Each image partition or image unit is assigned an image unit index. A filter is used for each group and the group can be identified by a group index, which may correspond to the image unit index for the first image unit in the group. For example, 4 filters for the luma component per frame may be used, and the corresponding group indices associated with the underlying image partitions or image units are 0, 4, 10, and 12, respectively as shown in FIG. 5. In other words, image units with image unit indices from 0 to 3 uses the first filter, image units with image unit indices from 4 to 9 uses the second filter, etc. In the embodiment of the present invention, the differences between two successive group indices are coded to represent the merge information. Accordingly, the corresponding group index differences are 4 (i.e., 4-0), 6 (i.e., 10-4), and 2 (i.e., 12-10). The group index difference is equivalent to the number of image unit in the corresponding group. Furthermore, the difference between two group indices and the corresponding filter coefficients can be coded in an interleaved fashion. In other words, each group index and associated filter parameters are in consecutive locations in the bitstream and this applies to all groups. An exemplary syntax design according to this embodiment is illustrated in Table 1.

TABLE 1

| ALFParam(compIdx) | Note |
|---|---|
| { | |
| ...... | |
| if (compIdx == Luma) { | |
|   groupIdx = 0; | |

TABLE 1-continued

| ALFParam(compIdx) | Note |
|---|---|
| num_filters_per_frame_minus1 | (1) |
| for (int i=0; i< num_filters_per_frame_minus1+1; i++) | |
| { | |
|   if ( i>0) | |
|   { | |
|     groupIdx += delta_group_idx; | (2) |
|   } | |
|   ALFFiltCoeff (groupIdx) ; | (3) |
| } | |
| ...... | |
| } | |

In Table 1, the total number of filters per frame is indicated by num_filters_perframe_minus1+1 as shown in Note (1). The current group index is recovered from a previous group index and the group index difference in between as indicated by Note (2). The corresponding filter coefficients for the current group index are incorporated after the corresponding the group index as indicated by Note (3).

Figure 6:
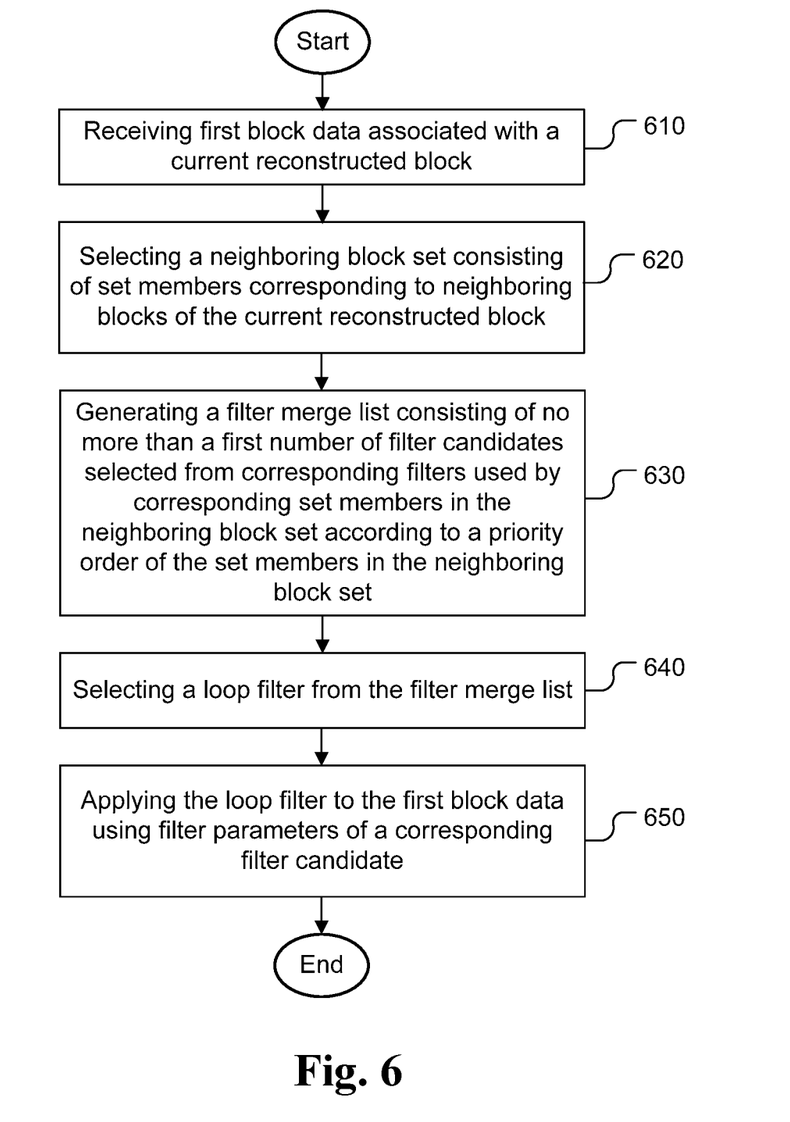
FIG. 6 illustrates an exemplary flowchart of priority-based filter merge according to an embodiment of the present invention.

FIG. 6 illustrates an exemplary flowchart of priority-based filter merge according to an embodiment of the present invention. The system receives first block data associated with a current reconstructed block as shown in step 610. For encoding, the first block data associated with a current reconstructed block corresponds to data related to the current reconstructed block from the reconstruction loop at the encoder side. For decoding, the first block data associated with the current reconstructed block corresponds to the data related to the current reconstructed block decoded and reconstructed from the bitstream. The first block data may be retrieved from storage such as a computer memory, buffer (RAM or DRAM) or other media. The input data may also be received from a processor such as a controller, a central processing unit, a digital signal processor or electronic circuits that produce the input data. A neighboring block set consisting of set members corresponding to neighboring blocks of the current reconstructed block is selected in step 620. A filter merge list consisting of no more than a first number of filter candidates selected from corresponding filters used by corresponding set members in the neighboring block set is generated according to a priority order of the set members in the neighboring block set as shown in step 630. A loop filter is selected from the filter merge list in step 640 and the loop filter is applied to the first block data using filter parameters of a corresponding filter candidate in step 650.

Figure 7:
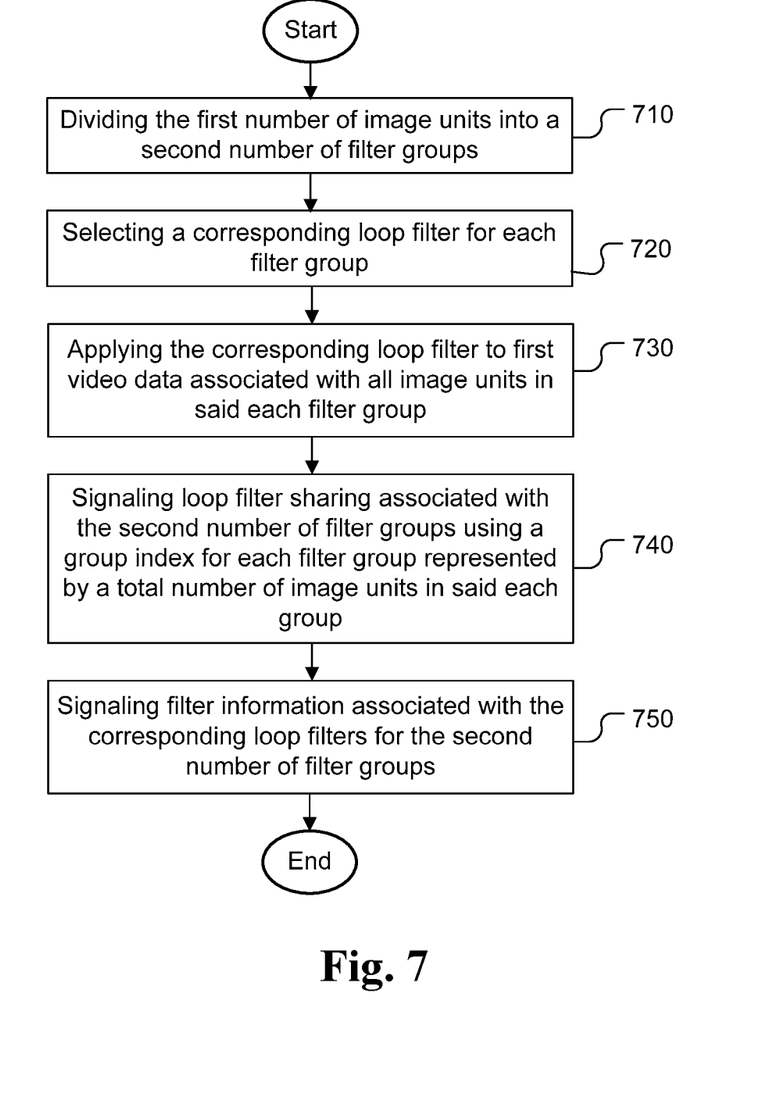
FIG. 7 illustrates an exemplary flowchart of signaling for filter merge at an encoder side according to an embodiment of the present invention, where each picture of the reconstructed video is partitioned into a first number of image units and each of the first number of image units is assigned an image unit index.

FIG. 7 illustrates an exemplary flowchart of signaling for filter merge at an encoder side according to an embodiment of the present invention, where each picture of the reconstructed video is partitioned into a first number of image units and each of the first number of image units is assigned an image unit index. The first number of image units is divided into a second number of filter groups in step 710. A corresponding loop filter is selected for each filter group in step 720. The corresponding loop filter is applied to first video data associated with all image units in said each filter group in step 730. The loop filter sharing associated with the second number of filter groups is signaled using a group index for each filter group represented by a total number of image units in said each group in step 740. The filter information associated with the corresponding loop filters is signaled for the second number of filter groups in step 750.

Figure 8:
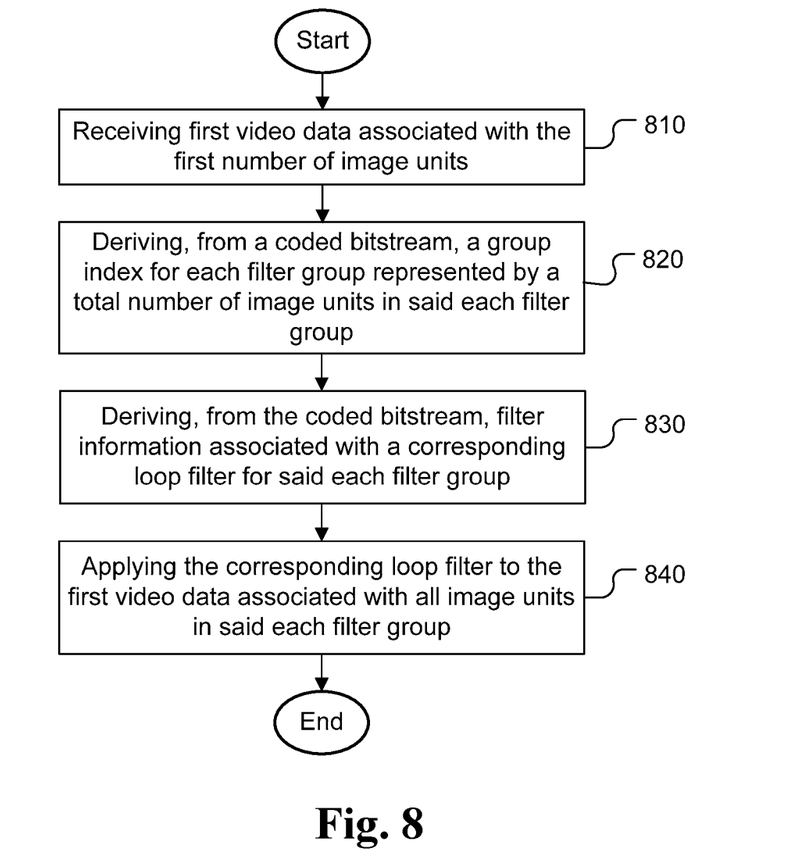
FIG. 8 illustrates an exemplary flowchart of signaling for filter merge at a decoder side according to an embodiment of the present invention, where each picture of the reconstructed video is partitioned into a first number of image units and each of the first number of image units is assigned an image unit index.

FIG. 8 illustrates an exemplary flowchart of signaling for filter merge at a decoder side according to an embodiment of the present invention, where each picture of the reconstructed video is partitioned into a first number of image units and each of the first number of image units is assigned an image unit index. The system receives first video data associated with the first number of image units in step 810. A group index for each filter group represented by a total number of image units in said each filter group is derived from a coded bitstream in step 820. The filter information associated with a corresponding loop filter is derived for said each filter group from the coded bitstream in step 830. The corresponding loop filter is applied to the first video data associated with all image units in said each filter group in step 840.

The flowcharts shown above are intended to illustrate examples of adaptive loop filtering method according to the present invention. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of adaptive loop filtering for reconstructed video in a video encoder, the method comprising: partitioning a picture of the reconstructed video into a first number of image units according to position of each pixel in the picture; dividing the first number of image units into a second number of filter groups; selecting a corresponding loop filter for each filter group; applying the corresponding loop filter to first video data associated with all image units in said each filter group; deriving a total number of image units in said each filter group based on an image unit index assigned for a first image unit in said each filter group; signaling loop filter sharing associated with the second number of filter groups using a group index for said each filter group represented by the total number of image units in said each filter group, wherein the group index corresponds to an image unit index for a first image unit in each group; and signaling filter information associated with each corresponding loop filter for the second number of filter groups, wherein the group index and the filter information associated with each corresponding loop filter of each filter group are incorporated in consecutive locations of a coded bitstream for all filter groups.

2. The method of claim 1, wherein the first video data corresponds to the reconstructed video, a first output data resulted from applying deblocking process to the reconstructed video, or a second output data resulted from said applying deblocking process and sample adaptive offset (SAO) process to the reconstructed video.

3. A method of adaptive loop filtering for reconstructed video in a video decoder, the method comprising: receiving first video data associated with a first number of image units partitioned from a picture of the reconstructed video according to a position of each pixel in the picture; deriving, from a coded bitstream, a group index for each filter group represented by a total number of image units in said each filter group, wherein the total number of image units in said each filter group corresponds to an image unit index assigned for a first image unit in said each filter group, wherein the group index corresponds to an image unit index for a first image unit in each group; deriving, from the coded bitstream, filter information associated with each corresponding loop filter for said each filter group; and applying each corresponding loop filter to the first video data associated with all image units in said each filter group, wherein the group index and the filter information associated with each corresponding loop filter of each filter group are incorporated in consecutive locations of the coded bitstream for all filter groups.

4. The method of claim 3, wherein the first video data corresponds to the reconstructed video, a first output data resulted from applying deblocking process to the reconstructed video, or a second output data resulted from said applying deblocking process and sample adaptive offset (SAO) process to the reconstructed video.

* * * * *